US007617130B2

(12) United States Patent
Bezos et al.

(10) Patent No.: US 7,617,130 B2
(45) Date of Patent: Nov. 10, 2009

(54) METHOD AND SYSTEM FOR INFORMATION EXCHANGE BETWEEN USERS OF DIFFERENT WEB PAGES

(75) Inventors: Jeffrey P. Bezos, Greater Seattle, WA (US); Ashish Gupta, Los Altos, CA (US)

(73) Assignee: Amazon Technologies, Inc., Reno, NV (US)

( * ) Notice: Subject to any disclaimer, the term of this patent is extended or adjusted under 35 U.S.C. 154(b) by 600 days.

(21) Appl. No.: 11/092,200

(22) Filed: Mar. 28, 2005

(65) Prior Publication Data

US 2005/0171861 A1 Aug. 4, 2005

Related U.S. Application Data

(63) Continuation of application No. 09/797,503, filed on Mar. 1, 2001, now Pat. No. 6,889,250.

(60) Provisional application No. 60/219,346, filed on Mar. 1, 2000.

(51) Int. Cl.
 *G06Q 30/00* (2006.01)
(52) U.S. Cl. ........................................... 705/26; 705/37
(58) Field of Classification Search .................. 705/26, 705/37
 See application file for complete search history.

(56) References Cited

U.S. PATENT DOCUMENTS

| 5,072,412 | A | 12/1991 | Henderson, Jr. et al. |
| 5,233,687 | A | 8/1993 | Henderson, Jr. et al. |
| 5,394,521 | A | 2/1995 | Henderson, Jr. et al. |
| 5,533,183 | A | 7/1996 | Henderson, Jr. et al. |
| 5,608,850 | A | 3/1997 | Robertson |
| 6,282,548 | B1 | 8/2001 | Burner et al. |
| 6,381,597 | B1 | 4/2002 | Lin |
| 6,405,175 | B1 | 6/2002 | Ng |
| 6,560,707 | B2 | 5/2003 | Curtis et al. |
| 6,598,026 | B1 * | 7/2003 | Ojha et al. ..................... 705/26 |
| 6,609,128 | B1 * | 8/2003 | Underwood .................. 707/10 |
| 6,687,734 | B1 | 2/2004 | Sellink et al. |
| 6,721,802 | B1 | 4/2004 | Wright et al. |
| 6,772,335 | B2 | 8/2004 | Curtis et al. |
| 7,107,227 | B1 * | 9/2006 | Bezos et al. .................. 705/26 |
| 7,373,313 | B1 | 5/2008 | Kahle et al. |

OTHER PUBLICATIONS

"Authoring specialized Web sites: the Education Book Reviews Web site" Katherine Corby, Steven Sowards. Reference Services Review. Bradford: 2000. vol. 28, Iss. 1; p. 47, downloaded from ProQuest Direct on the Internet on May 10, 2009, 11 pages.*
Moock's Mudding Guide, Mud Starter Kit ( 10 pages); http://www.moock.org/muds/starterkit.html (of-record in parent application).
Bowen, Jonathan P. and Houghton, Michael K., "Networked Multi-User and Multimedia Environments for Learning and Collaboration," Nov. 1999 (15 pages) (of-record in parent application).

(Continued)

*Primary Examiner*—James Zurita
(74) *Attorney, Agent, or Firm*—Knobbe Martens Olson & Bear, LLP (57) ABSTRACT

A method and system for allowing users of different web pages to exchange information. The information exchange system identifies groups of related web pages and maintains a database of user-supplied information for each group of related web pages. When a user accesses a web page the information exchange often displays in a separate area the information associated with the group of related web pages. Also the information exchange system allows the user to enter information that will be displayed to other users who access related web pages.

26 Claims, 9 Drawing Sheets

OTHER PUBLICATIONS

DocuShare 2.1 User's Guide Chapter 9; DocuShare Bulletin Boards, Copyright 1997 Xerox Corporation (8 pages) (of-record in parent application).

Using Xerox DocuShare 2.1, DocuShare 2.1 User's Guide Chapter Using Xerox DocuShare 2, Copyright 1997, Xerox Corporation (1 page); http://www.cotr.bc.ca/Docushare/en-us/Help/manual/dsman.htm (of-record in parent application).

Salon Technology, Three Lives in Everquest, The Rise of Denani: Character One, Day One; Nindari, the High Elf of Norrath, Copyright 2000 Salon.com (6 pages); http://archive.salon.com/tech/feature/1999/06/15/everquest/index1.html (of-record in parent application).

Mnookin, Jennifer, L., Virtual(ly) Law: The Emergence of Law in Lambda MOO, (25 pages); http://www.ascusc.org/jcmc/vol2/issue1/lambda.html (of-record in parent application).

Curtis, Pavel, "Mudding: Social Phenomena in Text-Based Virtual Realities," (20 pages); http://www.scara.com/~ole/literature/mudding.html (of-record in parent application).

Curtis, Pavel LambdaMOO Programmer's Manual for LambdaMOO Version 1.80p6, Mar. 1997 (2 pages); http://cmc.uib.no/moo/docs/manuals/formatted/html/ProgrammersManual_toc.html (of-record in parent application).

Curtis, Pavel LambdaMOO Programmer's Manual for LambdaMoo Version 1.80p6, Mar. 1997 (69 pages); http://cmc.uib.no/moo/docs/manuals/formatted/html/ProgrammersManual.html (of-record in parent application).

Reid, Elizabeth, "Cultural Formations in Text-Based Virtual Realities," Copyright 1994 (17 pages); http://www.zacha.net/articles/reid/html (of-record in parent application).

Moock's Mudding Guide, Mud Starter Kit (10 pages) http://www.moock.org/muds/starterkit.html Bowen, Jonathan P. and Houghton, Michael K., "Networked Multi-User and Multimedia Environments for Learning and Collaboration," Nov. 1999 (15 pages).

DocuShare 2.1 User's Guide Chapter 9: DocuShare Bulletin Boards, Copyright 1997 Xerox Corporation (8 pages).

Using Xerox DocuShare 2.1, DocuShare 2.1 User's Guide Chapter Using Xerox DocuShare 2, Copyright 1997, Xerox Corporation (1 page) http://www.cotr.bc.ca/Docushare/en-us/Help/manual/dsman.htm.

Salon Technology, Three Lives in Everquest, The Rise of Denani: Character ONe, Day One; Nindari, the High Elf of Norrath, Copyright 2000 Salon.com (6 pages) http://archive.salon.com/tech/feature/1999/06/15/everquest/index1.html Mnookin, Jennifer, L., Virtual(ly) Law: The Emergence of Law in Lambda MOO, (25 pages) http://www.ascusc.org/jcmc/vol2/issue1/lambda.html.

Curtis, Pavel, "Mudding: Social Phenomena in Text-Based Virtual Realities," (20 pages) http://www.scara.com/~ole/literature/mudding.html.

Curtis, Pavel LambdaMOO Programmer's Manual for LambdaMOO Version 1.8.0p6, Mar. 1997 (2 pages) http://cmc.uib.no/moo/docs/manuals/formatted/html/ProgrammersManual_toc.html.

Curtis, Pavel LambdaMOO Programmer's Manual for LambdaMOO Version 1.8.0p6, Mar. 1997 (69 pages); http://cmc.uib.no/moo/docs/manuals/formatted/html/ProgrammersManual.html.

Reid, Elizabeth, "Cultural Formations in Text-Based Virtual Realities," Copyright 1994 (17 pages) http://www.zacha.net/articles/reid.html.

U.S. Appl. No. 12/048,044, filed Mar. 13, 2008 (copies of filing receipt, application text and drawings provided).

Hopper, Ian, "Desktops now have power to comparison shop," CNN.com, Oct. 18, 1999.

Maney, Kevin, "Auctions change the way we shop," refreq.com; Nov. 17, 1999.

Archived web pages of mysimon.com web site obtained from www.archive.org—five printed pages describing mySimon Flyswat.

Festa, Paul, "Amazon pops into consumer reviews with zBubbles," cnet.com; Nov. 17, 1999.

Gillmor, Dan, "Subversive Software At Your Service; San Jose Mercury News," Oct. 17, 1999.

Archived web pages of rusure.com web site obtained from www.archive.org—six printed pages total.

O'Brien, Jim, "Don't check Out Without Them: Desktop shopping agents find . . . ," Computer Shopper; Mar. 2000.

Gingerich, Jason, "Keycorp Making site Into Portal," South Bend Tribune; Oct. 25, 1999.

Peet, John, "Survey of E-commerce: In the great web bazaar everything has its price. The web can help you find out what it is," Economist; Feb. 26, 2000.

Spring, Tom; Updated Flyswat Search Has Better Aim; PC World; Feb. 15, 2000.

* cited by examiner

User Database

| user id | I.E. enabled | category | category | | 601 |
|---|---|---|---|---|---|
| 1 | Yes | skiing | football | ... | |
| 2 | No | science fiction | books | | |
| | | | | | |
| N | | | | | |

Page/Category Database

| URL | category | category | | 602 |
|---|---|---|---|---|
| http://www ... | skiing | snow sports | ... | |
| http://www ... | books | science fiction | | |
| | | | | |

METHOD AND SYSTEM FOR INFORMATION EXCHANGE BETWEEN USERS OF DIFFERENT WEB PAGES

RELATED APPLICATIONS

This application is a continuation of U.S. patent application Ser. No. 09/797,503 filed Mar. 1, 2001 now U.S. Pat. No. 6,889,250, entitled "METHOD AND SYSTEM FOR INFORMATION EXCHANGE BETWEEN USERS OF DIFFERENT WEB PAGES," which application claims the benefit of provisional U.S. Patent Application No. 60/219,346 filed Mar. 1, 2000, (formerly non-provisional application Ser. No. 09/516,063) entitled "METHOD AND SYSTEM FOR INFORMATION EXCHANGE BETWEEN USERS OF DIFFERENT WEB PAGES," which are hereby incorporated by reference in their entireties.

TECHNICAL FIELD

The present invention relates generally to accessing information and, more particularly, to exchanging information related to web pages.

BACKGROUND

Because it facilitates electronic communications between vendors and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce the acceptance and wide-spread use of electronic commerce depends, in large part, upon the ease-of-use of conducting such electronic commerce. If electronic commerce can be easily conducted, then even the novice computer user will choose to engage in electronic commerce. Therefore, it is important that techniques be developed to facilitate conducting electronic commerce.

The Internet facilitates conducting electronic commerce in part because it uses standardized techniques for exchanging information. Many standards have been established for exchanging information over the Internet such as electronic mail. Gopher and the World Wide Web ("WWW") The WWW service allows a server computer system (i.e. web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page a client computer system specifies the URL for that web page in a request (e.g. a HyperText Transfer Protocol ("HTTP") request). The request is forwarded to the web server that supports that web page. When that web server receives the request it sends the requested web page to the client computer system. When the client computer system receives that web page, it typically displays the web page using a browser. A browser is typically a special-purpose application program that effects the requesting of web pages and the displaying of web pages.

Currently, web pages are generally defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The World Wide Web portion of the Internet is especially conducive to conducting electronic commerce. Many web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser may browse through the catalog using a browser and select various items that are to be purchased. When the user has completed selecting the items to be purchased, the server computer system then prompts the user for information to complete the ordering of the items. This purchaser-specific order information may include the purchaser's name the purchaser's payment information (e.g. credit card number), and a shipping address for the order. The server computer system then typically confirms the order by sending a confirming web page to the client computer system and schedules shipment of the items.

One problem with the conducting of electronic commerce via the World Wide Web is that it is difficult for users to obtain sufficient information on items that are being sold. For example, a user may desire to know what other users think of the item that the user is contemplating purchasing. Some server computer systems allow users to provide comments relating to an item. For example, a web page for a certain book may allow users to provide a summary of the book or other comments related to that book. When other users access the web page for that book, the server computer system can add those comments to web page. Although such a mechanism for providing comments improves the dissemination of information, the comments are accessible to and can be entered by only those users to happen to access that web page. In particular, a vendor who sells that same book would not have access to those comments provided to any other vendor's web pages. Thus, a user may need to visit various vendor web sites to obtain sufficient information to make an informed purchasing decision. More generally, it is difficult for users of one web site to share information with users of another web site. It would be desirable to have a system in which information could be more readily disseminated to web users.

DETAILED DESCRIPTION

A method and system for exchanging information between users of different web pages is provided. The information exchange system allows users of one web page to view information provided by users of another web page which may be hosted on a different web site. The information exchange system allows a user who is accessing a certain web page to supply information (e.g., comments) to be associated with that web page in a manner that is separate from or outside of the web page itself. The system provides that user-supplied information to other users who access related web pages. The information exchange system has relationship information that indicates which web pages are related. For example, the relationship information may indicate that a web page for a book at one web site is related to a web page for that book at another web site. When another user accesses a related web page, then the information exchange system retrieves the user-supplied information associated with the related web pages and provides that information to the user accessing the web page. In one embodiment the information is provided to users in a frame or window that is separate from the frame or window in which the web page is displayed. In this way, a user is not limited to reviewing information that is provided by other users of the same web page.

In one embodiment, the information exchange system provides a client-side component and a server-side component. The client-side component executes on a user's computer, and the server-side component executes on an information exchange computer. The client-side component, which may be a browser plug-in a proxy server or other type of program monitors a user's access to web pages. When a web page is accessed the client-side component sends an indication of the accessed web page to the server-side component. The server-side component then determines if information associated with a related web page has been entered by a user. If so the server-side component sends the information to the client-side component. The client-side component then controls the display of the information at the user's computer. For example the client-side component may display the information in a frame adjacent to the accessed web page. The client-side component may also allow the user to enter information to be associated with the accessed web page. If so, the client-side component sends the entered information to the server-side component so that information can be stored and then provided when related web pages are accessed. In another embodiment, the information exchange system may only have a server-side component. In such embodiment, all requests to access a web page may be routed through the information exchange system. The information exchange system would then retrieve the web page from the server that hosts that web page and then retrieve the user-supplied information associated with related web pages. The information exchange system would then provide both the web page and the information to the requesting user's computer. The information exchange system may modify the web pages that it provides to the requesting user's computer so that accesses to navigation links of that web page are routed through the information exchange system. In this way, the information exchange system can detect when web pages are accessed.

The information exchange system may provide various ways for relating web pages. In one embodiment, the information exchange system may maintain a mapping of each web page to its related web pages. Whenever a web page is accessed, then the information associated with the related web pages is retrieved and provided to the user accessing the web page. In another embodiment each web page can be associated with a category or categories within a hierarchy of categories. Web pages associated with the same categories are considered related. Whenever such a web page is accessed the information exchange system would determine the categories of that web page and provide the user-supplied information associated with those categories. If a web page is associated with multiple categories then the information exchange system may request that the user select the category of interest. In another embodiment the information exchange system may relate web pages based upon keywords associated with each web page or in any other way in which web pages may be related. Also the relationship between web pages can be dynamically identified. For example the information exchange system may categorize a web page when it is accessed by analyzing the content of the web page. Also, web pages may be identified as related based on analysis of access patters of users. For example if a set of users access a certain group of web pages, then they may be considered to be related. The information exchange system may use clustering techniques or collaborative filter techniques so as to identify the groups of related web pages.

The information exchange system may allow user-supplied information to be organized using various models. In one embodiment, the information exchange system stores all information provided by any user who accesses any web page in a group of related web pages. When a user accesses one of the related web pages, then the information exchange system provides this information to the accessing user. Alternatively, the information exchange system may provide a chat session model in which users can, in real-time, see and respond to information provided by users of related web pages. In another alternative embodiment, the information exchange system may provide the information in a bulletin board-type model. Also, the information provided may not necessarily be user-supplied. Instead, the information may be provided by a non-user entity. For example, a book review service may provide book reviews that are displayed whenever a user accesses a web page relating to a certain book. The book review service may not have a user who accesses any of the related web pages.

Figure 1:
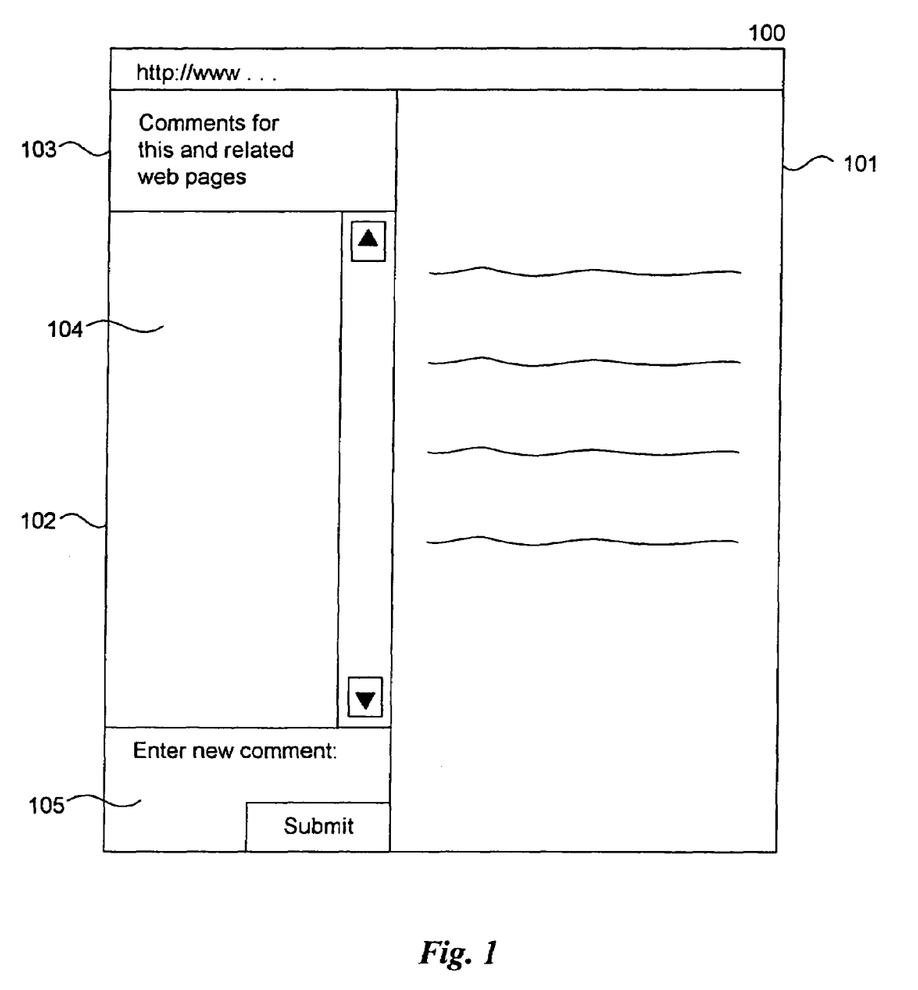
FIG. 1 illustrates a sample display of a web page and accompanying exchanged information.

FIG. 1 illustrates a sample display of a web page and accompanying exchanged information. The display 100 includes a web page area 101 and information exchange area 102. The web page area contains the content of the web page that is being accessed. The information exchange area includes a title sub-area 103 an information display sub-area 104 and a new comment sub-area 105. In this example an information entered by users of the related web page is displayed in order of entry when a user accesses one of the related web pages. That information is displayed in the information display sub-area. A user may use a scroll bar to scroll through the displayed information. The information exchange system may display an indication of the date and time that information was entered by the user and may also display an indication of the identify of the user who entered information. The user may be identified by name or b a moniker to conceal the user's actual identity. A user may enter additional information in the new comment sub-area and then select the submit button to submit the comments to the information exchange system. When the information exchange system receives the new comments, it stores the comments in a database keyed to the group of related web pages. In this example, the information exchange area is shown as part of the same window that contains the web page area. One skilled in the art will appreciate that the information exchange area may also be stored in a separate window that may be a pop-up window.

Figure 2:
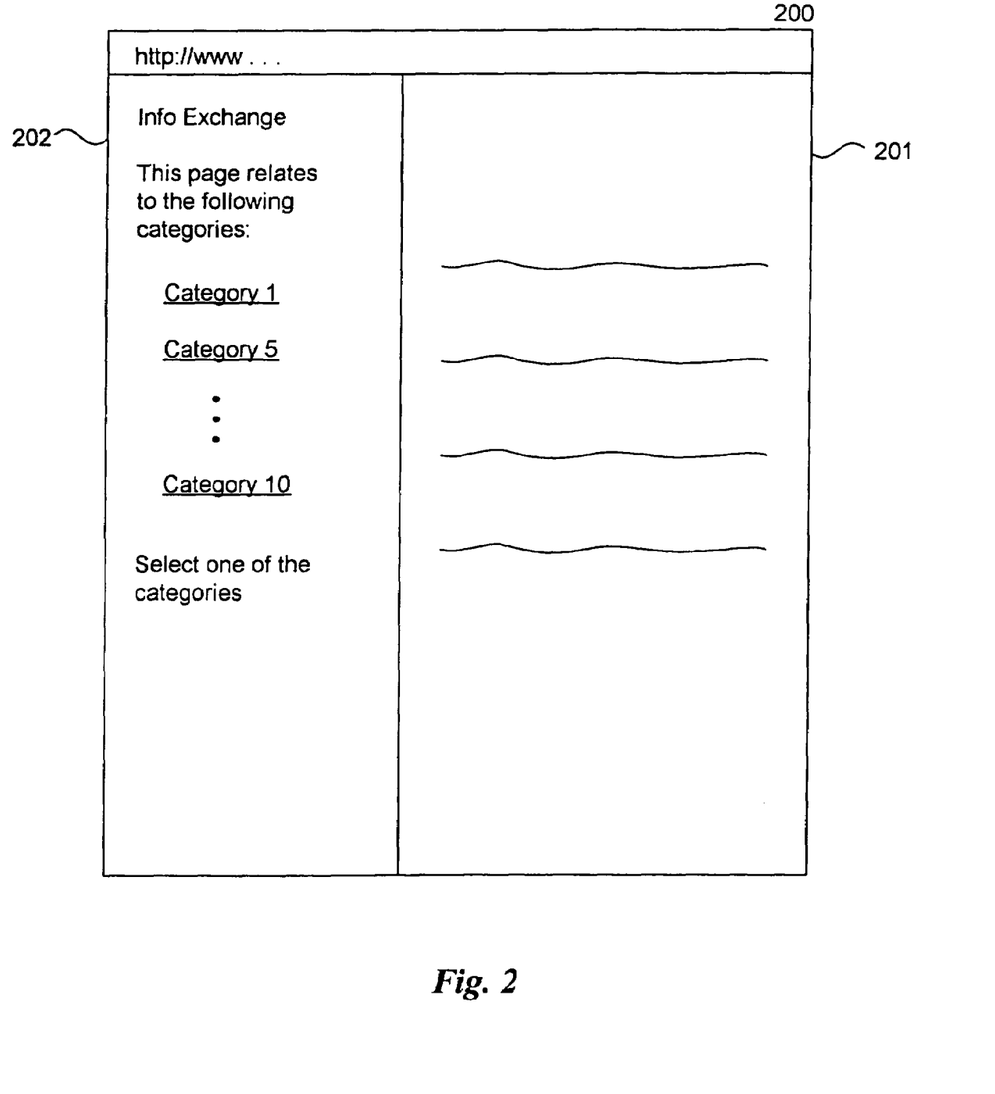
FIG. 2 illustrates a sample display of a web page and accompanying category information.

FIG. 2 illustrates a sample display of a web page and accompanying category information. The category information may include a hierarchy of categories that are associated with web pages. For example, a web page may be within a sporting category and further within a football sub-category of the sporting category. If a user selects to view information relating to the sporting category, then the information exchange system would displayed information relating to all web pages in the sporting category regardless of their underlying sub-categories. Alternatively, if the user browses to and selects the football sub-category, then the information exchange system would display only information relating to web pages in the football sub-category. The display 200 includes a web page area 201 and a category selection area 202. The category selection contains area contains links associated with each category. When a user selects a category, then the information exchange system displays an information exchange area containing information relating to the selected category. The information exchange may allow user to indicate a desire to list the sub-categories of a displayed category. For example when a user moves a pointer over (e.g., mouse over) a category name, the information exchange system may display the sub-categories that are associated with the web page. The user can then select a sub-category to view information related only to web pages in that sub-category.

Figure 3:
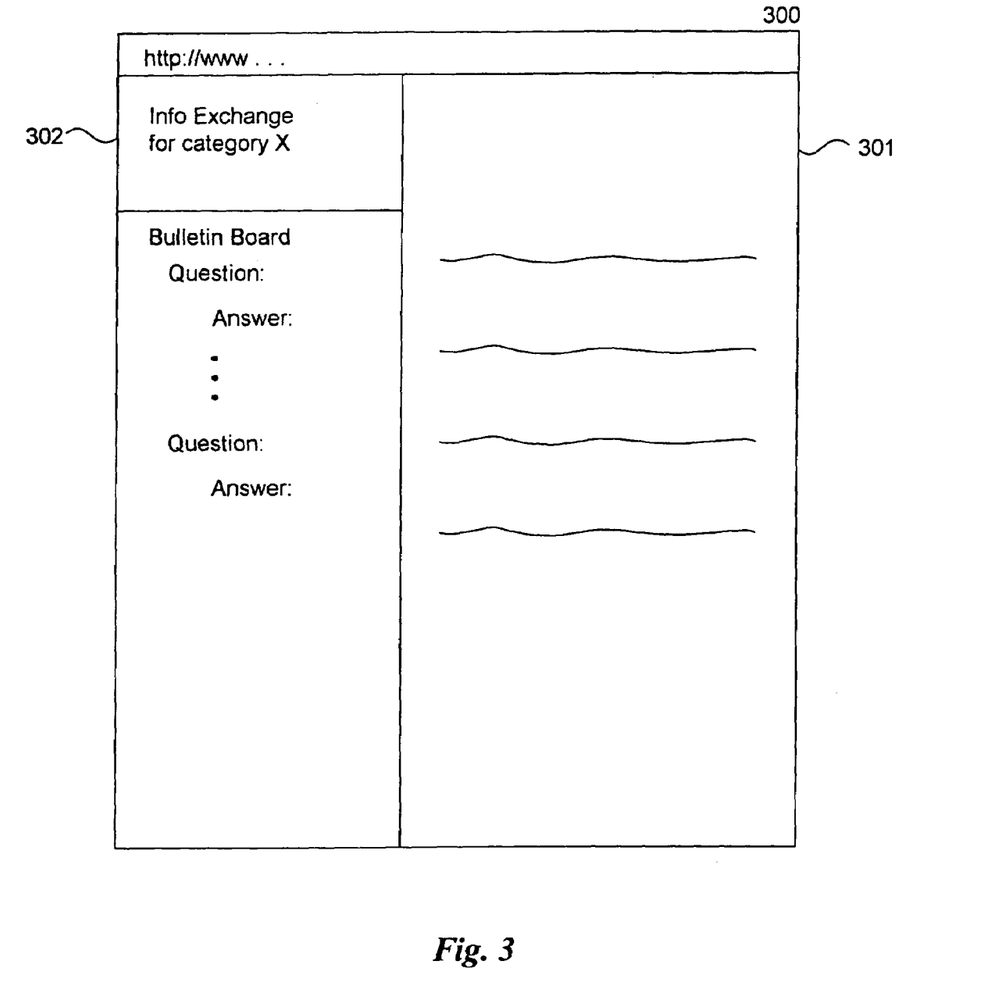
FIG. 3 illustrates a sample display of a web page and accompanying exchanged information in a bulletin board format.

FIG. 3 illustrates a sample display of a web page and accompanying, exchanged information in a bulletin board format. The display 300 includes a web page area 301 and a bulletin board area 302. The bulletin board area displays questions posted by users and answers by other users to those questions. A user may use conventional bulletin board techniques to submit questions and answers via the bulletin board area.

Figure 4:
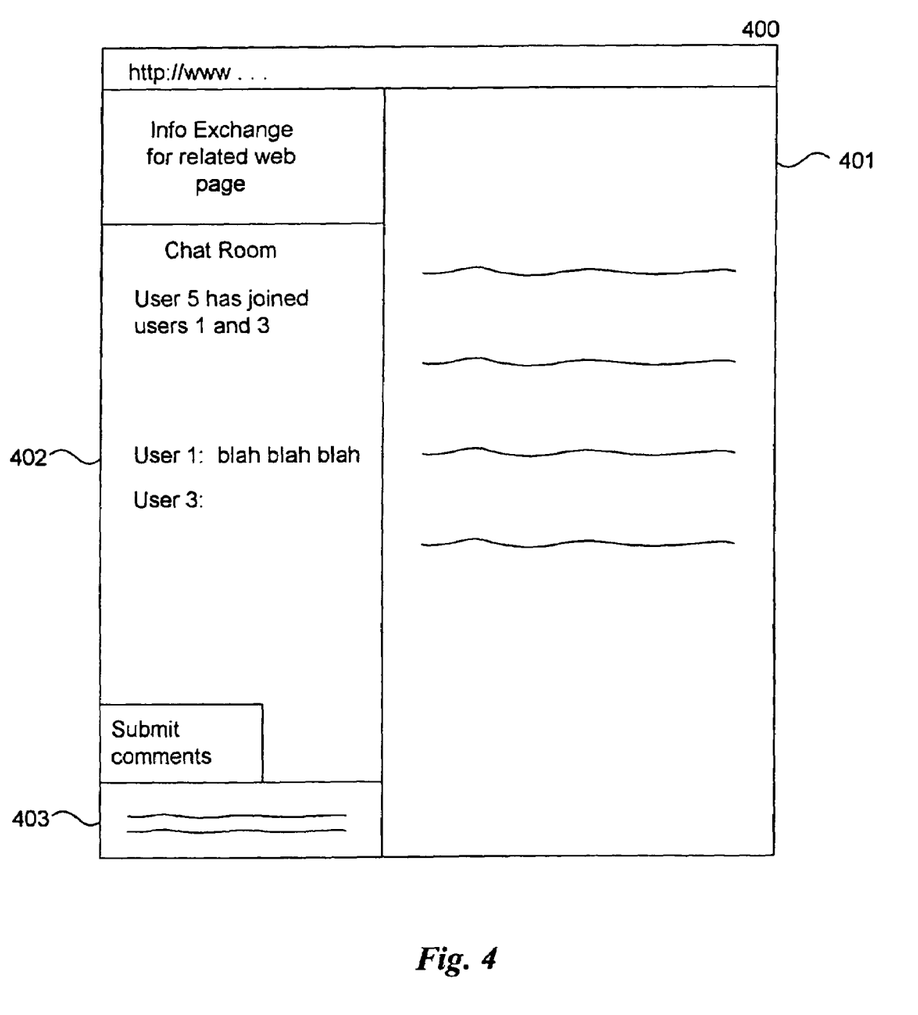
FIG. 4 illustrates a sample display of a web page and accompanying exchanged information in a chat room format.

FIG. 4 illustrates a sample display of a web page and accompanying exchanged information in a chat room format. The display 400 includes a web page area 401 and a chat room area 402. The chat room area displays the contents of current conversations currently being conducted by users accessing any web pages in a group of related web pages. A user may enter comments in the entry area 403 and select the submit comments button to provide the comments to the information exchange system. When the information exchange system receives the comments, it stores them in a database associated with that group of related web pages. The information exchange system may then send those comments to all other users were currently accessing related web pages.

Figure 5:
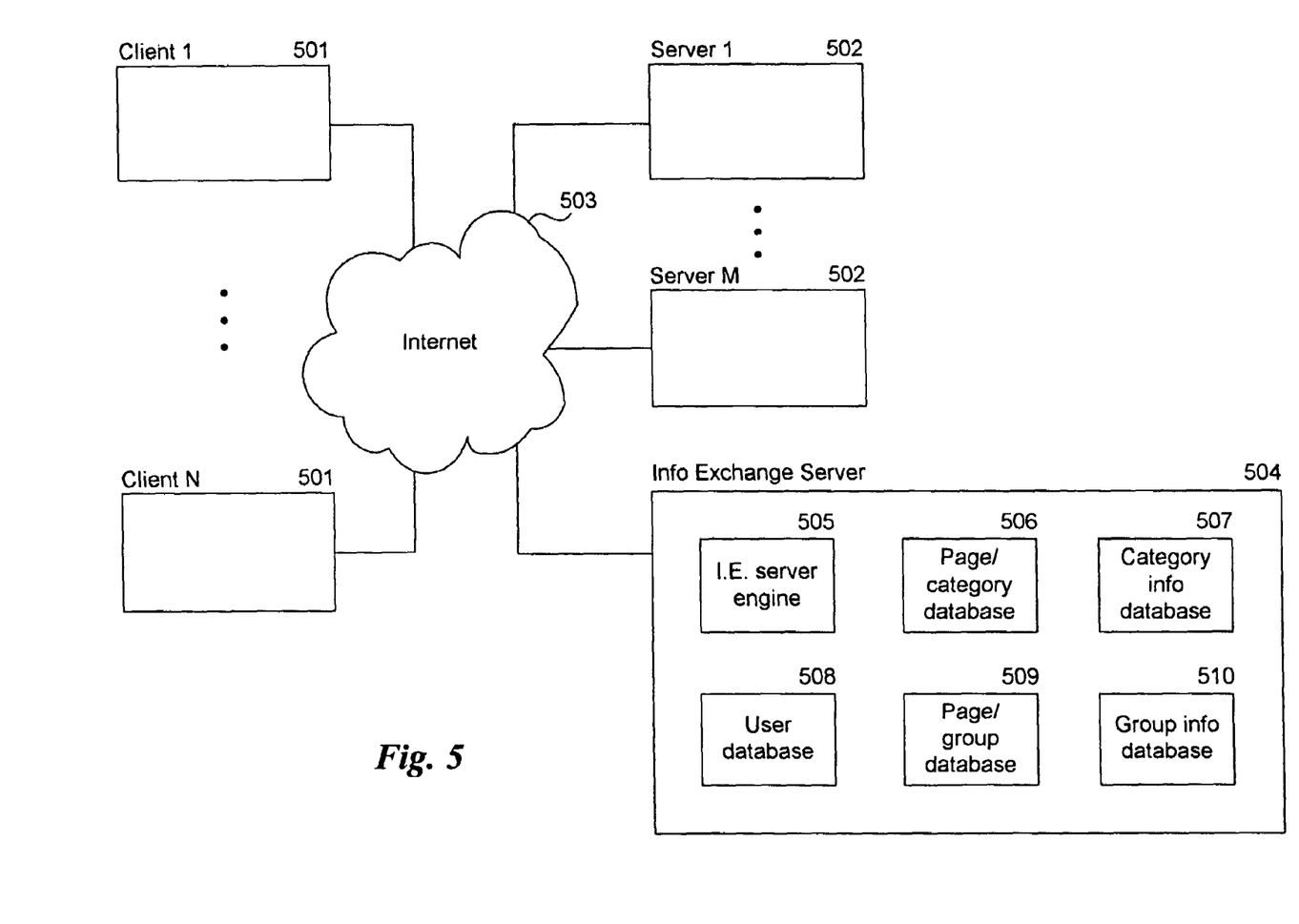
FIG. 5 is a block diagram illustrating components of the information exchange system in one embodiment.

FIG. 5 is a block diagram illustrating components of the information exchange system in one embodiment. The client computers 501 and the server computers 502 and 504 are interconnected via the Internet 503. The computers may include a central processing unit, memory, input devices (e.g., keyboard and pointing device), output devices (e.g., display devices), and storage devices (e.g., disk drives). The memory and storage devices are computer-readable media that may contain computer instructions that implement the information exchange system. The client computers may use a browser to access various web pages via the Internet. The information exchange server computer 504 includes information exchange server engine 505, a page/category database 506 a category information database 507, a user database 508, a page/group database 509, and a group information database 510. The information exchange server engine receives notifications that a web page has been accessed retrieves information associated with related web page, and supplies that information to a client computer system. The page/category database contains a mapping from each web page to the categories associated with that web page. When the information exchange server engine receives an indication that a web page has been accessed, it may access the page/category database to identify the categories associated with that web page. The category information database contains a mapping from each category to the information associated with that category. The information may be formatted according to the model used to present the information. For example if the information is presented using a bulletin board information model, then the information in the category information database may be stored in a question and answer format. The user database may contain information relating to the various users and an indication as to whether they are authorized to use the information exchange system. The user database may also contain a listing of the categories of interest to a user. The information exchange system may only display information to users when they access a web page in the category, of interest as indicated by the user database. The page/group database and the group information database are analogous to the page/category and the category information databases in that they define a relationship of web pages and the associated information. A grouping of web pages can simply be some collection of web pages that are defined to be related. The grouping of web page can be performed automatically in various ways. For example, clustering techniques can be used based on review of access patterns or analysis of the text of a web page using information as retrieval ("IR") techniques.

One skilled in the art will appreciate the concepts of information exchange system can be used in various environments other than the Internet. For example, the concepts can also be used in electronic mail environments in which the electronic mail messages may include the equivalent of a web page and associated exchanged information. New information can be supplied by sending an electronic message to the information exchange server. Also, various communication channels other than the Internet may be used, such as a local area network a wide area network, or a point-to-point dial-up connection. The concepts of the information exchange system may also be used in a single computer environment rather than a client/server environment. Also the information exchange server may comprise any combination of hardware or software that can support these concepts. In particular, the server system may actually include multiple computers. A client system may comprise any combination of hardware or software that interacts with the server system. These client systems may include television-based systems and various other consumer products through which web pages may be accessed.

Figure 6:
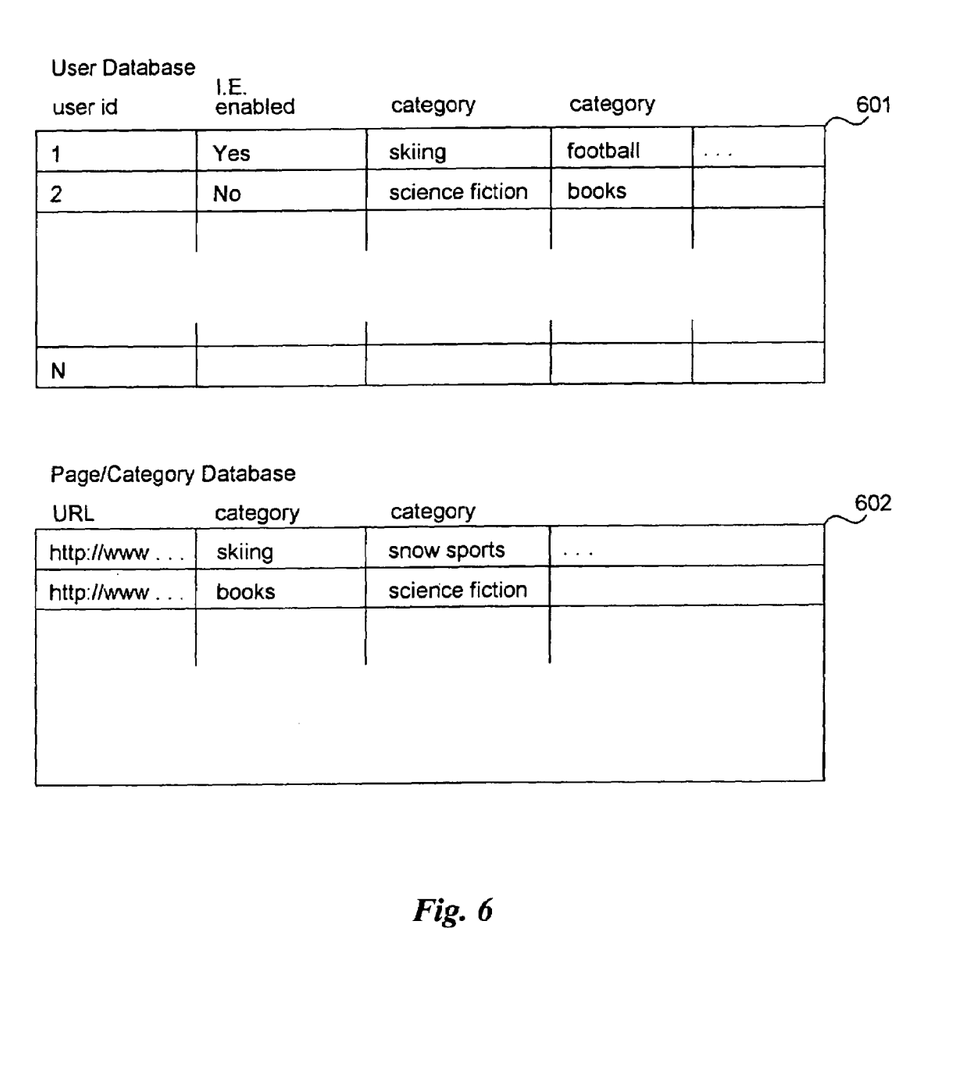
FIG. 6 is a diagram illustrating the contents of various databases.

FIG. 6 is a diagram illustrating the contents of various databases. Table 601 illustrates sample contents of a user database. The user database mass contain a user identification an indication as to whether information exchange is enabled for the user and various categories that are of interest in the user. For example a user may express an interest in web pages in the categories of science fiction or skiing. When the user accesses a web page in a science fiction or skiing category then the information exchange system would display exchanged information relating to that category. However when the user access to web page not related to a category of interest, the information exchange system would not display in the information associated with that web page. One skilled in the art will also appreciate that various different techniques may be used for specifying, categories of interest. For example, a user may indicate that all categories are of interest. Table 602 illustrates sample contents of a page/category database. Each entry in this database contains a mapping from the URL of a web page to the various categories the web page is within.

Figure 7:
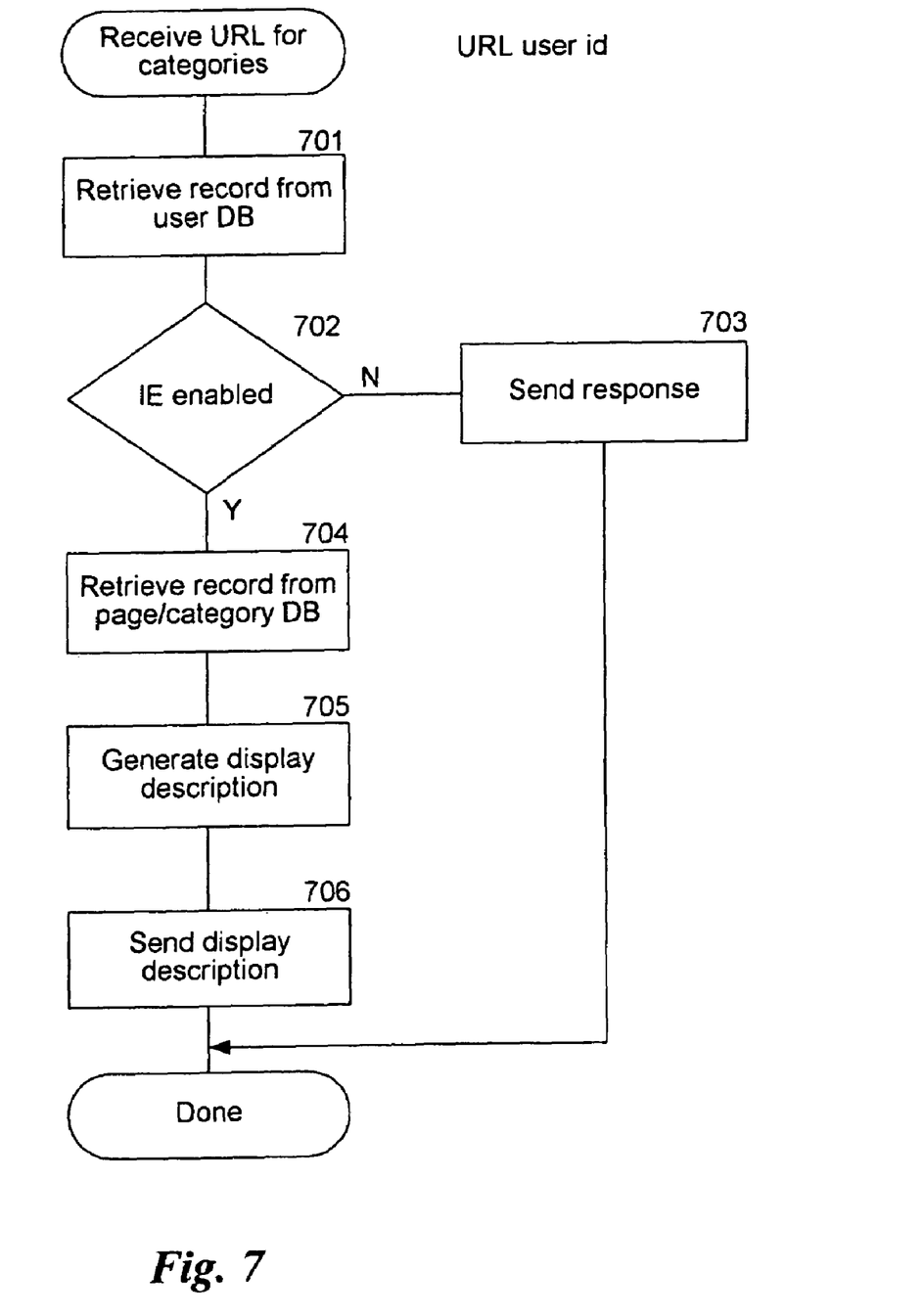
FIG. 7 is a flow diagram illustrating the processing of the information exchange server engine when a URL is received.
Figure 8:
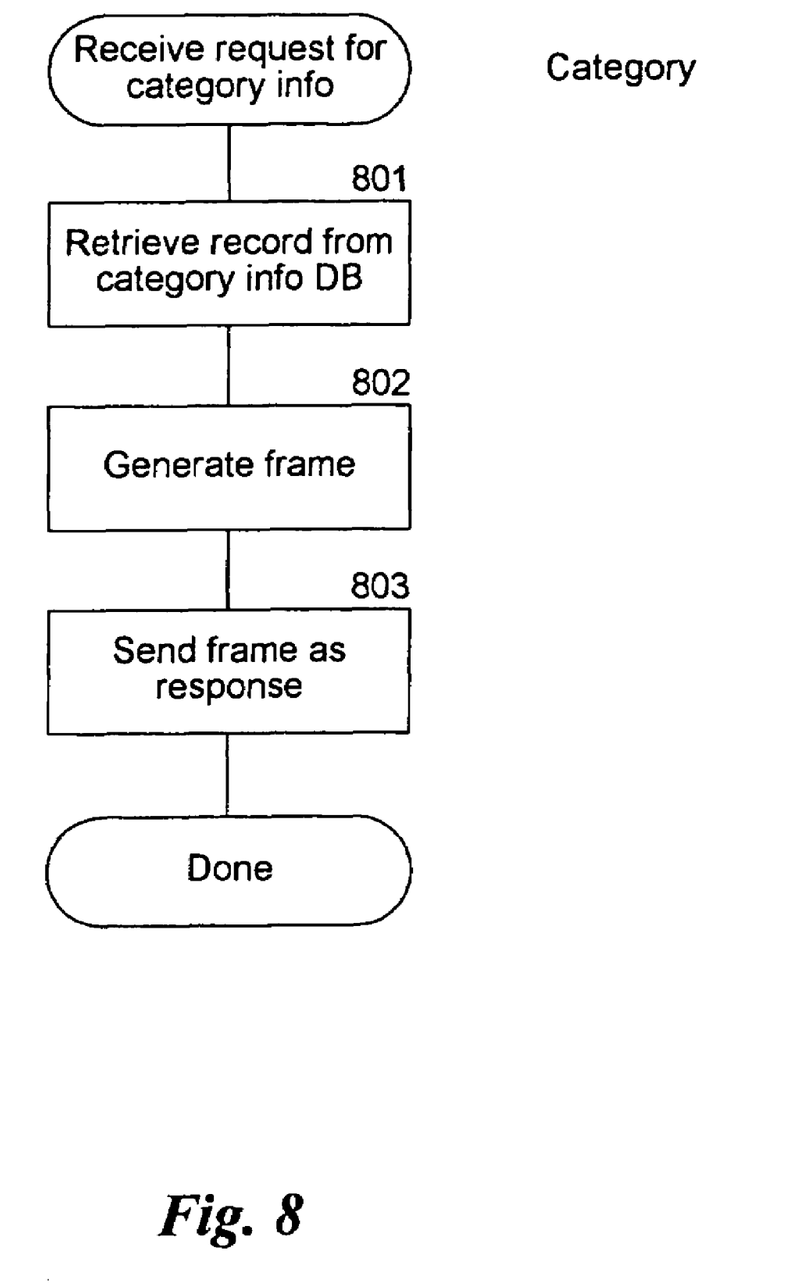
FIG. 8 is a flow diagram illustrating the processing of the information exchange server engine when a category selection is received.
Figure 9:
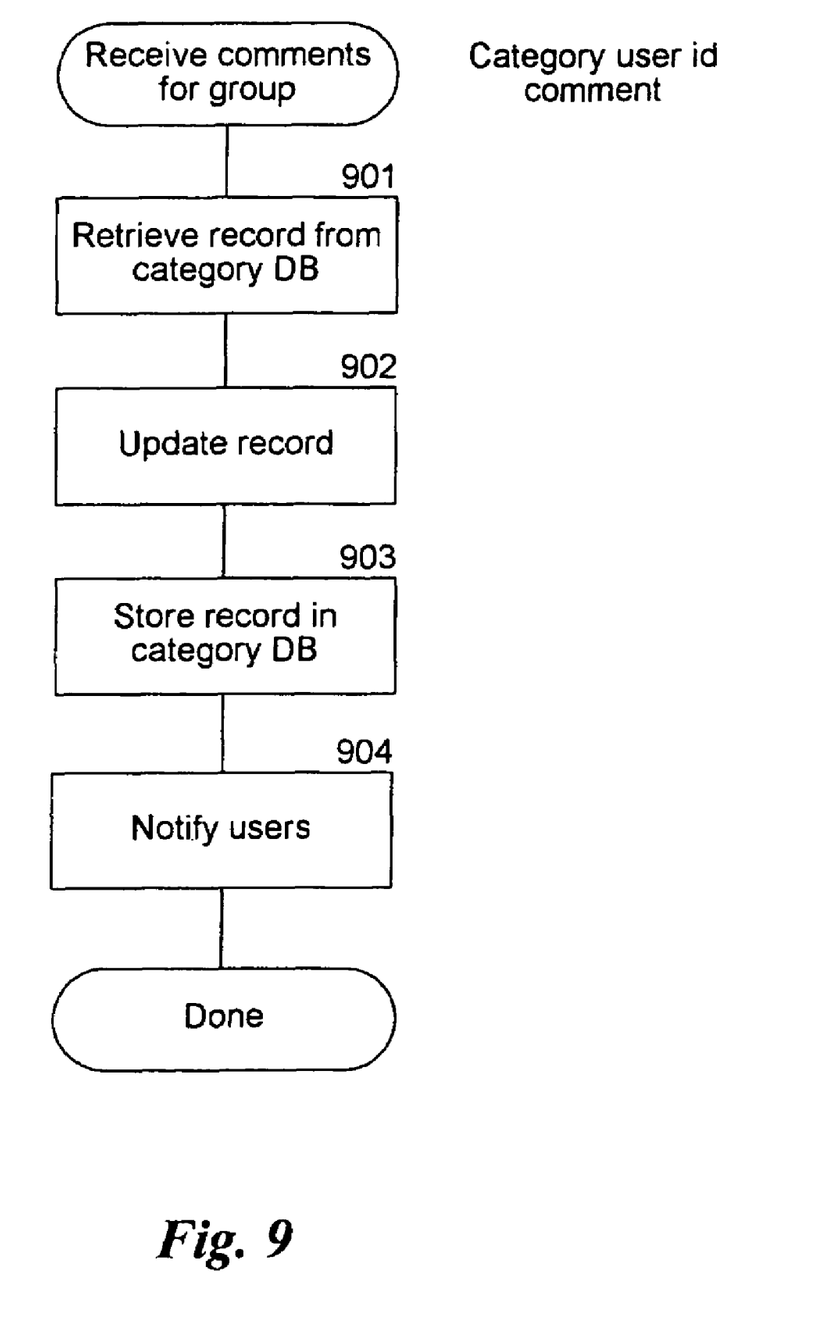
FIG. 9 is a flow diagram illustrating example processing of the information exchange server engine when user comments are received.

FIGS. 7-9 are flow diagrams illustrating example processing of the information exchange system. FIG. 7 is a flow diagram illustrating the processing of the information exchange server engine when a UPL is received. This routine is passed a URL and a user ID. In block 701, the routine retrieves a record from the user database for the passed user ID. In decision block 702, if the retrieved record indicates that information exchange is enabled for that user, then the routine continues at block 704, else the routine continues at block 703. In a block 703, the routine sends an appropriate notification to the user and then completes. In block 704, the routine retrieves a record from the page/category database for the passed URL. This retrieved record indicates the categories associated with the passed URL. In block 705, the routine generates a display description for a category information area. The routine may limit the categories to those of interest to the user as indicated by the user database. This display description may be described using HTML. In block 706, the routine sends the display description to the user computer and then completes.

FIG. 8 is a flow diagram illustrating the processing of the information exchange server engine when a category selection is received. This routine is passed an indication of a selected category. In block 801 the routine retrieves a record for the category from the category information database. In block 802 the routine generates a display description containing the exchanged information from the retrieved record. In block 803 the routine sends the generated display description to the user computer and then completes.

FIG. 9 is a flow diagram illustrating example processing of the information exchange server engine when user comments are received. This routine is passed an indication of a category, a user ID, and the comments. In block 901 the routine retrieves the record for the category from the category information database. In block 902 the routine updates the retrieved record with the comments. In block 903 the routine stores the updated record back into the category information database. In block 904, the routine notifies current users, as appropriate, that the information has been changed. The routine then completes.

From the foregoing it will be appreciated that although specific embodiments of the information exchange system have been described for purposes of illustration, various modifications may be made without deviating from the spirit and scope of the invention. For example, user-supplied information can be associated with resources other than that web page. For example, the information can be associated with any URL or any display description that describes a display layout. Accordingly the invention is not limited except by the appended claims.

The invention claimed is:

1. A computer-implemented method of supporting exchanges of information between users, the method comprising:

receiving, and storing in computer storage, information submitted by a first user of a first site of a first entity, said information pertaining to, and submitted while accessing, a first page of the first site, wherein receiving information submitted by the first user comprises receiving information entered by the first user into an information entry area that is separate from, but displayed in conjunction with, the first page, said information entry area provided by one of (1) a client component that runs on a computing device of the first user, and (2) a proxy server that monitors accesses by said computing device of the first user to web pages;

receiving a notification of an access by a second user to a second page of a second site of a second entity, said second page being related to the first page and said second entity being different than the first entity; and while the second user is accessing the second page of the second site, transmitting the information submitted by the first user to a computing device of the second user for display to the second user in conjunction with the second page;

wherein the method is performed by a server system that is separate from both the first site and the second site, said server system operated by a service provider entity that is different from the first entity.

2. The method of claim 1, wherein the first site comprises a first server and the second site comprises a second server, said first and second servers being separate from said server system.

3. The method of claim 1, wherein the information entry area is provided by a client component that runs on a computing device of the first user.

4. The method of claim 3, wherein the client component is a browser plug-in.

5. The method of claim 3, wherein the notification is generated by said client component in response to the second user accessing the second page.

6. The method of claim 1, wherein the information entry area is provided by a proxy server.

7. The method of claim 1, wherein transmitting said information comprises communicating said information to a browser plug-in that runs on the computing device of the second user.

8. The method of claim 1, wherein said information is transmitted to the computing device of the second user based at least in part on a determination by said server system that the first and second pages are related.

9. The method of claim 8, wherein the server system makes said determination by accessing a database that associates particular pages with related pages.

10. The method of claim 9, further comprising generating said database based at least partly on a keyword analysis of particular pages.

11. The method of claim 9, further comprising generating said database based at least partly on page access patterns of users.

12. The method of claim 1, wherein the information submitted by the first user comprises a comment on an item represented on both the first page and the second page.

13. The method of claim 12, wherein the item is a product that is available for purchase from both the first site and the second site.

14. The method of claim 1, wherein the information is transmitted to the computing device of the second user substantially in real time in response to receiving the information from a computing device of the first user.

15. A system for supporting exchanges of information between users, the system comprising:
   a server system; and
   executable instructions stored in computer storage of the server system, said executable instructions capable of causing the server system to perform a method that comprises:
   receiving, and storing in said computer storage, information submitted by a first user of a first site, said information pertaining to, and submitted while accessing, a first page of the first site, wherein receiving information submitted by the first user comprises receiving information entered by the first user into an information entry area that is separate from, but displayed in conjunction with, the first page, said information entry area provided by one of (1) a client component that runs on a computing device of the first user, and (2) a proxy server that monitors accesses by said computing device of the first user to web page;
   receiving a notification of an access by a second user to a second page of a second site, said second page being related to the first page; and
   while the second user is accessing the second page of the second site, transmitting the information submitted by the first user to a computing device of the second user for display to the second user in conjunction with the second page;
   wherein the server system is separate from both the first site and the second site.

16. The system of claim 15, wherein the information entry area is provided by a client component that runs on a computing device of the first user.

17. The system of claim 15, in combination with a client component adapted to run on computing devices of users and to communicate with the server system.

18. The system of claim 16, wherein the client component is a browser plug-in.

19. The system of claim 16, wherein the client component is additionally operative to cause the user computing device to display, in conjunction with a page displayed on the user computing device, information submitted by other users via instances of said client component.

20. The system of claim 16, wherein the client component and server system are operative to provide a real time chat environment in which, when the first user submits a comment in association with the first page, the comment is sent in real time to other users that are accessing a related page.

21. The system of claim 15, wherein the computer storage of the server system comprises a mapping that associates pages with related pages, and the server system is operative to use said mapping to control exchanges of information between users.

22. The system of claim 21, wherein the server system is programmed to generate the mapping based at least partly on an analysis of page content.

23. The system of claim 21, wherein the server system is programmed to generate the mapping based at least partly on an analysis of user access patterns.

24. A computer storage system comprising at least one computer-readable medium, said computer storage system storing executable instructions capable of causing a server system to perform a method that comprises:
   receiving, and storing in computer storage, information submitted by a first user of a first site that is separate from the server system, said information pertaining to, and submitted by the first user while the first user is accessing, a first page of the first site, wherein receiving information submitted by the first user comprises receiving information entered by the first user into an information entry area displayed by a computing device of the first user, said information entry area being separate from, but displayed in conjunction with, the first page;
   receiving a notification of an access by a second user to a second page of a second site that is separate from the server system and the first site, said second page being related to the first page; and
   while the second user is accessing the second page of the second site, transmitting the information submitted by the first user to a computing device of the second user for display to the second user in conjunction with the second page.

25. The method of claim 24, wherein the information entry area is provided by a client component that runs on the computing device of the first user.

26. The method of claim 24, wherein the information entry area is provided by a proxy server.

* * * * *

UNITED STATES PATENT AND TRADEMARK OFFICE
CERTIFICATE OF CORRECTION

PATENT NO. : 7,617,130 B2  Page 1 of 1
APPLICATION NO. : 11/092200
DATED : November 10, 2009
INVENTOR(S) : Bezos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1054 days.

Signed and Sealed this

Fourteenth Day of December, 2010

David J. Kappos
*Director of the United States Patent and Trademark Office*